United States Patent
Zhang

(10) Patent No.: US 10,718,249 B2
(45) Date of Patent: Jul. 21, 2020

(54) PARTICLE FILTER IN THE EXHAUST SYSTEM OF AN INTERNAL COMBUSTION ENGINE

(71) Applicant: Continental Automotive GmbH, Hannover (DE)

(72) Inventor: Hong Zhang, Tegernheim (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/092,822

(22) PCT Filed: Feb. 9, 2017

(86) PCT No.: PCT/EP2017/052929
§ 371 (c)(1),
(2) Date: Oct. 11, 2018

(87) PCT Pub. No.: WO2017/178131
PCT Pub. Date: Oct. 19, 2017

(65) Prior Publication Data
US 2019/0162101 A1 May 30, 2019

(30) Foreign Application Priority Data

Apr. 15, 2016 (DE) .......... 10 2016 206 437

(51) Int. Cl.
*F01N 3/00* (2006.01)
*F01N 9/00* (2006.01)
(Continued)

(52) U.S. Cl.
CPC .......... *F01N 9/002* (2013.01); *F01N 3/021* (2013.01); *F01N 3/023* (2013.01); *F01N 11/002* (2013.01);
(Continued)

(58) Field of Classification Search
CPC .......... F01N 9/002; F01N 3/021; F01N 3/023; F01N 11/002
(Continued)

(56) References Cited

U.S. PATENT DOCUMENTS

| 8,528,321 B2 | 9/2013 | Lee et al. ........................ 60/286 |
| 8,713,991 B2 | 5/2014 | Allmendinger et al. .... 73/28.02 |

(Continued)

FOREIGN PATENT DOCUMENTS

| CN | 1512043 A | 7/2004 | ............... F01N 9/00 |
| CN | 103703234 A | 4/2014 | ............. F01N 3/025 |

(Continued)

OTHER PUBLICATIONS

German Office Action, Application No. 10 2016 206 437.1, 7 pages, dated Dec. 5, 2016.
(Continued)

*Primary Examiner* — Jason D Shanske
(74) *Attorney, Agent, or Firm* — Slayden Grubert Beard PLLC

(57) ABSTRACT

Various embodiments may include a method for regenerating a particle filter comprising: increasing a measured exhaust-gas temperature from a normal operation level to above a desorption start temperature defined by initiating release of sulfur compounds accumulated in the particle filter; monitoring a particle mass in the exhaust-gas flow downstream of the particle filter; comparing the particle mass to a predefined threshold value above which the formation of white smoke can be expected; if the threshold value is exceeded, setting the exhaust-gas temperature to a desorption temperature for release of sulfur compounds until the particle mass falls below the threshold; if the particle mass threshold value is not exceeded, setting the exhaust-gas temperature to a regeneration temperature for burning-
(Continued)

off of the particle loading of the particle filter for a predetermined time period; and after the time period has elapsed, ending the regeneration by lowering the temperature to the normal operation level.

8 Claims, 2 Drawing Sheets

(51) Int. Cl.
  *F01N 3/023* (2006.01)
  *F01N 3/021* (2006.01)
  *F01N 11/00* (2006.01)

(52) U.S. Cl.
  CPC ...... *F01N 2250/02* (2013.01); *F01N 2560/05* (2013.01); *F01N 2560/12* (2013.01); *F01N 2570/04* (2013.01); *F01N 2900/0416* (2013.01); *F01N 2900/1402* (2013.01); *F01N 2900/1606* (2013.01); *Y02T 10/47* (2013.01)

(58) Field of Classification Search
  USPC .......................................................... 60/274
  See application file for complete search history.

(56) References Cited

U.S. PATENT DOCUMENTS

| | | | |
|---|---|---|---|
| 2004/0123590 A1 | 7/2004 | Tabata et al. | 60/295 |
| 2010/0107737 A1 | 5/2010 | Krafthefer et al. | 73/28.01 |
| 2011/0146233 A1* | 6/2011 | Carlill | F01N 3/0235 60/274 |
| 2011/0146244 A1* | 6/2011 | Farman | F01N 3/035 60/285 |
| 2011/0146245 A1* | 6/2011 | Farman | F02D 41/029 60/286 |
| 2012/0291628 A1* | 11/2012 | Seo | F01N 3/103 95/18 |
| 2017/0074181 A1* | 3/2017 | Goto | F02D 41/0235 |

FOREIGN PATENT DOCUMENTS

| | | | | |
|---|---|---|---|---|
| DE | 10 2009 058 107 A1 | 6/2011 | ............... | F01N 3/02 |
| DE | 10 2011 014 718 A1 | 10/2012 | ............... | F01N 9/00 |
| DE | 10 2011 014 718 B4 | 11/2012 | ............... | F01N 9/00 |
| DE | 10 2012 104 261 A1 | 11/2012 | ............... | F01N 9/00 |
| DE | 10 2011 089 503 A1 | 6/2013 | ............... | F01N 11/00 |
| DE | 10 2015 103 176 A1 | 9/2015 | ............... | F01N 11/00 |
| DE | 10 2015 112 922 A1 | 2/2016 | ............... | F01N 11/00 |
| KR | 20110062149 A | 6/2011 | ............. | B01D 53/92 |
| KR | 20130112564 A | 10/2013 | ............... | F01N 3/02 |
| KR | 101405795 B1 | 6/2014 | ............ | F01N 3/023 |
| WO | WO-2012126892 A1 * | 9/2012 | ........... | F02D 41/024 |
| WO | 2017/178131 A1 | 10/2017 | ............. | F01N 3/021 |

OTHER PUBLICATIONS

International Search Report and Written Opinion, Application No. PCT/EP2017/052929, 18 pages, dated Apr. 26, 2017.

Korean Notice of Allowance, Application No. 2020-018928927, 3 pages, dated Mar. 12, 2020.

Chinese Office Action, Application No. 201780023800.7, 21 pages, dated Mar. 20, 2020.

* cited by examiner

PARTICLE FILTER IN THE EXHAUST SYSTEM OF AN INTERNAL COMBUSTION ENGINE

CROSS-REFERENCE TO RELATED APPLICATIONS

This application is a U.S. National Stage Application of International Application No. PCT/EP2017/052929 filed Feb. 9, 2017, which designates the United States of America, and claims priority to DE Application No. 10 2016 206 437.1 filed Apr. 15, 2016, the contents of which are hereby incorporated by reference in their entirety.

TECHNICAL FIELD

The present disclosure relates to internal combustion engines. Various embodiments may include a method for the regeneration of a particle filter in the exhaust system of an internal combustion engine during operation.

BACKGROUND

To adhere to the legal regulations concerning the maintenance of clean air, modern motor vehicles operated with internal combustion engines are generally equipped with exhaust-gas purification systems. Said systems have for example so-called oxidation catalytic converters and, in particular in diesel combustion engines, also particle filters for absorbing soot particles in the exhaust gas. In order to prevent blockage of the particle filter, it may be necessary in the case of a corresponding loading of the particle filter for a regeneration process to be realized, in which process the particles which have accumulated in the particle filter are generally burned in the particle filter as a result of a corresponding increase in temperature of the exhaust gas to temperatures between 500° C. and 700° C. The increase in temperature is in this case may be realized by targeted variation of the operating parameters of the internal combustion engine.

As is described for example in DE 10 2011 014 718 A1 and also in US 2010 01 07 737, accumulation of sulfur-containing compounds in the particle filter and, if appropriate, also in the oxidation catalytic converter occurs at the same time, in particular during the operation of the respective internal combustion engine with fuels having increased sulfur content. In the regeneration phase of the particle filter, a rapid release of the accumulated sulfur compounds, which, together with the steam present in the exhaust gas, can form sulfuric acid, then occurs owing to the greatly increased exhaust-gas temperatures. As a result of the exhaust-gas flow being cooled again on the path through the exhaust-gas system to temperatures below the acid dew point, an aerosol, which is visible as dense white smoke, so-called "white smoke", is formed.

The document DE 102011014718 B4 discloses a method for avoiding white smoke. Accordingly, the desorption, that is to say the release of the sulfur compounds, is realized in a temperature range of 300° C. to 500° C., e.g. of 400° C. to 450° C. At these exhaust-gas temperatures increased in this manner, the desorption of the sulfur compounds can over a longer time period, for example up to 10 minutes. The concentration of the aerosol in the exhaust gas is thereby kept so low that no white smoke can be perceived. This controlled desorption is in each case carried out before the regeneration of the particle filter. The further increase in the exhaust-gas temperature for the regeneration of the particle filter is realized only afterward. However, in this method, the desorption of the sulfur compounds has to be carried out over an extended time period prior to each regeneration of the particle filter owing to the size of the loading of the particle filter with sulfur compounds being unknown. This leads to increased fuel consumption, even during the operation of the internal combustion engine with fuels having low sulfur content where it might not be necessary to carry out the above-described method.

An attempt is made to solve said problem by way of the subject matter disclosed in the document DE 10 2009 058 107 A1. Here, it is established by means of a determination means whether the temperature of the particle filter falls below a predefined threshold value, for example a temperature of 340° C. Since sulfuric acid, as an example of a sulfur-containing compound, decomposes only above a temperature of around 340° C., in the case of said threshold value of the temperature being fallen below, it is assumed that sulfur-containing compounds are accumulating in the particle filter.

The accumulated quantity of sulfur-containing compounds in the particle filter is determined on the basis of the quantity of fuel injected into the internal combustion engine and a value, predetermined on a country-specific basis, for the sulfur content of the fuel. Here, as soon as the temperature in the particle filter falls below a threshold value, the quantity of sulfur-containing compounds accumulating in the particle filter is added up. With the reaching of a predetermined threshold value, the desorption is then started by increasing the exhaust-gas temperature to a value of approximately 350° C. During the desorption, the previously accumulated quantity of sulfur is reduced by computational means, and the desorption is ended as soon as the computationally determined quantity of sulfur reaches the value zero or it is established by means of a sensor that sulfur compounds no longer occur in the exhaust gas. In this method, a sulfur content, known on a country-specific basis, of the fuel is assumed. It is furthermore proposed that, if a sensor for detecting the sulfur compounds in the exhaust gas is provided, it is possible on the basis of the sensor data for a different sulfur concentration in the fuel to be inferred and for the corresponding presetting value to be corrected.

Owing to the imprecise knowledge of the sulfur content and possibly further variables influencing the accumulation of sulfur and desorption, the method however appears to be imprecise and susceptible to errors. An additional sulfur sensor for detecting the sulfur content in the fuel, on the basis of which sensor the loading of the particle filter could be determined more accurately and it would be possible to carry out the desorption in a more targeted manner, could remedy the situation here. However, such a sensor is too expensive in many application cases and therefore cannot be used.

SUMMARY

The teachings of the present disclosure may be embodied in a method which allows the desorption of sulfur compounds in the particle filter to be carried out, with avoidance of white smoke formation, in a more targeted manner and only if, and for as long as, necessary without increasing the complexity of the exhaust-gas aftertreatment system and thus the costs thereof.

As an example, some embodiments may include a method for the regeneration of a particle filter in the exhaust system of an internal combustion engine during operation, which has the following steps: for the purpose of starting a regeneration phase, increasing a measured exhaust-gas temperature from a normal operation level to a temperature value above a desorption start temperature above which the release of sulfur compounds accumulated in the particle filter begins, monitoring the particle mass contained in the exhaust-gas flow downstream of the particle filter by means of an electrostatic particle mass sensor (ePM-S) arranged in the exhaust-gas flow downstream of the particle filter, and generating a particle mass actual value which is dependent on the particle mass, comparing the generated particle mass actual value with a predefined particle mass threshold value above which the formation of white smoke can be expected, if the particle mass threshold value is exceeded, setting the exhaust-gas temperature to a desorption temperature, for the release of sulfur compounds accumulated in the particle filter, until the particle mass actual value falls below the particle mass threshold value, if the particle mass threshold value is fallen below, setting the exhaust-gas temperature to a regeneration temperature, for the burning-off of the particle loading of the particle filter, for a predetermined time period, and after the predetermined time period has elapsed, ending the regeneration phase by lowering the exhaust-gas temperature to the normal operation level.

In some embodiments, for starting the regeneration phase, the exhaust-gas temperature is increased to the desorption temperature.

In some embodiments, for starting the regeneration phase, the exhaust-gas temperature is increased to the regeneration temperature.

In some embodiments, the desorption temperature lies in a temperature range of 300° C. to 500° C.

In some embodiments, the regeneration temperature lies in a temperature range of 550° C. to 750° C.

In some embodiments, if the particle mass threshold value is exceeded, the exhaust-gas temperature is regulated in a manner dependent on the particle mass actual value such that the particle mass actual value remains below the particle mass threshold value but above a lower particle mass limit value, this ensuring that the desorption is realized but no white smoke forms.

In some embodiments, the exhaust-gas temperature is set or regulated by means of an electronic engine control unit through suitable setting of operating parameters of the internal combustion engine in a manner dependent on the measured exhaust-gas temperature and on the particle mass actual value.

In some embodiments, the electrostatic particle mass sensor (ePM-S) has electrodes which are spaced apart from one another and which form an electric field through which a part of the exhaust-gas flow is conducted, said flow being laden with particles and sulfur compounds, wherein electrical charges are transmitted between the electrodes, this being measurable as an electrical signal which is proportional to the particle mass and to the sulfur content of the exhaust-gas flow.

BRIEF DESCRIPTION OF THE DRAWINGS

Below, various example embodiments, details, and/or developments are discussed in more detail on the basis of the figures, even though the subject matter of the disclosure is not restricted to these examples. In the figures.

Figure 1:
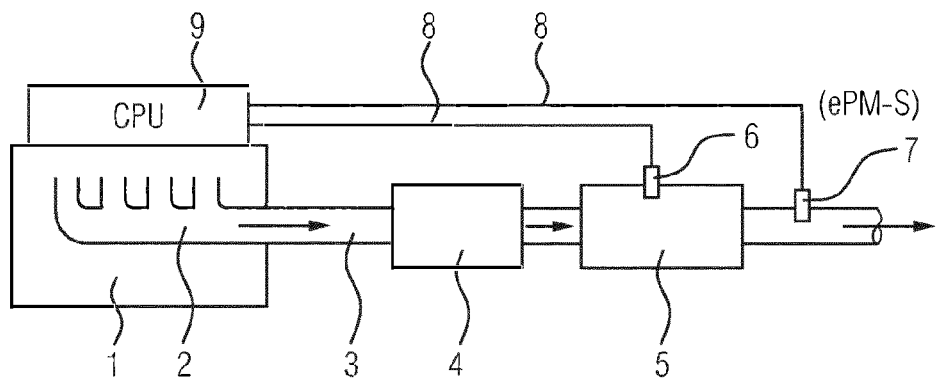
FIG. 1 shows a simplified schematic illustration of the structure of an exhaust system, including internal combustion engine, for carrying out a method incorporating teachings of the present disclosure.

Items with the same function and designation are denoted by the same reference signs throughout the figures.

DETAILED DESCRIPTION

In some embodiments, a method for the regeneration of a particle filter in the exhaust system of an internal combustion engine during operation includes multiple elements. Firstly, for the purpose of starting a regeneration phase, a measured exhaust-gas temperature is increased from a normal operation level, which corresponds to the exhaust-gas temperature during the intended normal operation of the internal combustion engine, to a temperature value above a desorption start temperature. The desorption start temperature indicates a temperature value above which the release of sulfur compounds accumulated in the particle filter begins and is for example at least 300° C., wherein a temperature of up to 400° C. may also be selected in order to start the desorption with a corresponding degree of certainty.

At the same time, the particle mass contained in the exhaust-gas flow downstream of the particle filter is monitored by means of an electrostatic particle mass sensor (ePM-S) arranged in the exhaust-gas flow downstream of the particle filter, and a particle mass actual value which is dependent on the particle mass is generated. In this case, such a sensor reacts to sulfur compounds transported in the exhaust gas in the same way that it reacts to other particles, such as for example soot.

The particle mass actual value generated by means of the electrostatic particle mass sensor is compared with a predefined particle mass threshold value above which the formation of white smoke can be expected. For example, the particle mass threshold value is for this purpose stored, together with a control program for carrying out the methods herein, in an electronic processing unit.

If the particle mass threshold value is exceeded, the exhaust-gas temperature is then set to a desorption temperature for the release of sulfur compounds accumulated in the particle filter and kept at said temperature until the particle mass actual value falls below the particle mass threshold value. Here, the desorption temperature is selected such that a "gentle" desorption can take place, during which the sulfur compounds accumulated in the particle filter are released gradually at a quantity per unit exhaust-gas volume at which it is ensured that no white smoke occurs.

If the particle mass threshold value is fallen below, which is the case for example if the sulfur content in the particle filter has already been greatly reduced by the desorption or was already correspondingly low at the start of the method, the exhaust-gas temperature is set to a regeneration temperature for the burning-off of the particle loading of the particle filter and is kept at said temperature for a predetermined time period. The regeneration temperature is in this case selected such that a reliable and quick "burning-free" of the particle filter is ensured, this preferably taking place in a temperature range between 550° C. and 750° C. The time period is likewise predefined for example such that, at the predefined exhaust-gas temperature, it is sufficient in all cases to burn off, for example by means of known methods, an established or estimated particle loading. After the predetermined time period has elapsed, the regeneration phase is then ended by the exhaust-gas temperature being lowered to the normal operation level. The teachings herein allow the regeneration of the particle filter of an internal combustion engine to be carried out during operation in an energy-saving and quick manner without producing white smoke independent of the sulfur content of the fuel. In particular, desorption of sulfur compounds deposited in the particle filter may be carried out in a demand-oriented manner in terms of frequency and duration in order to avoid the occurrence of white smoke. This not only contributes to the shortening of the regeneration phases, but also avoids an increased fuel demand owing to the required increase in exhaust-gas temperature, in particular when fuels with low sulfur content are used.

In some embodiments, for starting the regeneration phase, the exhaust-gas temperature is increased to the desorption temperature. The formation of white smoke as a result of initial overheating of the exhaust gas, and thus of the particle filter, is avoided in all cases.

In some embodiments, for starting the regeneration phase, the exhaust-gas temperature is increased to the regeneration temperature. In the case of a minor initial loading of the particle filter with sulfur and the associated non-occurrence of the exceedance of the particle mass threshold value, an immediate beginning of the regeneration, that is to say the burning-off of the particle loading, is ensured.

In some embodiments, the desorption temperature lies in a temperature range of 300° C. to 500° C., e.g. in a range between 400° C. and 450° C. This ensures a reliable start and a "gentle" execution of the desorption of the sulfur accumulated in the particle filter without white smoke forming in the process.

In some embodiments, the regeneration temperature lies in a temperature range of 550° C. to 750° C., e.g. in a range between 600° C. and 700° C. This ensures a reliable start and a swift execution of the burning-off of the particle loading accumulated in the particle filter.

In some embodiments, if the particle mass threshold value is exceeded, that is to say if a relevant loading of the particle filter with sulfur compounds is established, the exhaust-gas temperature is regulated in a manner dependent on the particle mass actual value, measured by the electrostatic particle mass sensor, such that the particle mass actual value remains below the particle mass threshold value but above a lower particle mass limit value, this ensuring that no white smoke forms. Here, the lower particle mass limit value is less than the particle mass threshold value, so that the particle mass actual value is firstly adjusted to a value between the particle mass limit value and the particle mass threshold value. In some embodiments, the particle mass actual value is adjusted to a value which lies in the upper third of the range spanned by the particle mass threshold value and the particle mass limit value. The desorption rate is close to the limit for white smoke formation, and thus the duration of the desorption can be shortened. At the same time, it should be noted in this case that the desorption temperature, which is predefined as a manipulated variable, varies within the permissible desorption temperature range. If, in this case, the lower particle mass limit value is fallen below despite the maximum desorption temperature, generally approximately 500° C., the continuation of the method with the regeneration of the particle filter is possible.

In some embodiments, the exhaust-gas temperature may be set or regulated by means of an electronic engine control unit through suitable setting of operating parameters of the internal combustion engine in a manner dependent on the measured exhaust-gas temperature and on the particle mass actual value. The electronic engine control unit may for example be the central processing unit (CPU) of the engine controller, which performs or controls or regulates all the important functions for operating the internal combustion engine. Also, the operating parameters of the internal combustion engine are set, controlled, and/or regulated in a load-dependent or operating point-dependent manner by this CPU. Operating parameters which influence the exhaust-gas temperature and thus may be used for the setting, control or regulation of the exhaust gas temperature are for example the quantity and the time of the fuel injection, the supplied fresh air mass flow and the ignition time, which may be correspondingly varied individually or in combination.

In some embodiments, an electrostatic particle mass sensor (ePM-S) has electrodes which are spaced apart from one another and which form an electric field. A part of the exhaust-gas flow is conducted through the electric field between the electrodes, said flow being laden with particles and sulfur compounds, wherein electrical charges from the particles and the sulfur compounds are transmitted between the electrodes, this being measurable as an electrical signal which is proportional to the particle mass and the sulfur content of the exhaust-gas flow. Here, the electrostatic particle mass sensor may be used for monitoring the filter function for detecting the sulfur content in the exhaust-gas flow, which sensor is possibly provided in the exhaust-gas system in any case, and thus no additional costs arise. The functioning of such an electrostatic particle mass sensor is known for example from the document U.S. Pat. No. 8,713,991 B2. Such a sensor also reacts to sulfur compounds in the exhaust-gas stream in almost the same way as it reacts to other particles, for example soot.

The features and combinations of features of the embodiments of the subject matter herein, which embodiments are specified above in the description or below in the figure description, insofar as they are not usable alternatively or are not mutually exclusive, can individually, partially, and/or entirely also be used in mutual combination or so as to supplement one another in the development of the subject matter without departing from the scope of the teachings herein.

FIG. 1 shows the basic structure of an exhaust system for carrying out a method incorporating teachings of the present disclosure, including the internal combustion engine 1. The internal combustion engine will generally be a diesel engine, but may also be a spark-ignition engine or an internal combustion engine operated with gas. The exhaust-gas flow of the internal combustion engine 1 is discharged into the exhaust pipe 3 via the exhaust manifold 2. Arranged in the exhaust pipe 3 one behind the other in the flow direction of the exhaust-gas flow (illustrated by arrows) are firstly an oxidation catalytic converter 4 and then a particle filter 5.

Generally, the particle filter 5 will be a soot-particle filter in conjunction with a diesel engine. Within the framework of ever more stringent exhaust-gas regulations, however, the importance of using a particle filter is also growing in case of the further internal combustion engine variants mentioned above, and for this reason the method is not restricted to the application in conjunction with a diesel engine. A temperature sensor 6 is arranged on the particle filter 5 for the purpose of measuring the exhaust-gas temperature, and, in the exhaust pipe downstream of the particle filter 5, an electrostatic particle mass sensor (ePM-S) is arranged in the exhaust-gas flow. Both the temperature sensor 6 and the ePM-S are connected via electrical signal lines 8 to the electronic engine control unit (CPU) 9 for the purpose of transmitting the corresponding sensor signals.

The electronic engine control unit 9 is in turn connected to the internal combustion engine 1 for the purpose of load-dependent or operating point-dependent control of the internal combustion engine. This is realized through presetting of the operating parameters and corresponding actuation of the corresponding function units, such as for example a throttle flap, the injection valves, a high-pressure fuel pump, an exhaust-gas recirculation valve, and so on. Such electronic engine control units are a regular constituent part of modern internal combustion engine systems and are also referred to as "central processing unit" (CPU). It is also possible for the methods described herein to be carried out with the aid of the CPU and corresponding program sequences which are stored there.

The arrangement illustrated is highly simplified and shows only the basic components. Further components, such as for example turbochargers, exhaust-gas recirculation systems, reducing-agent injectors and silencers and others, which can likewise be part of such a system, have not been illustrated here for the sake of clarity.

Figure 2:
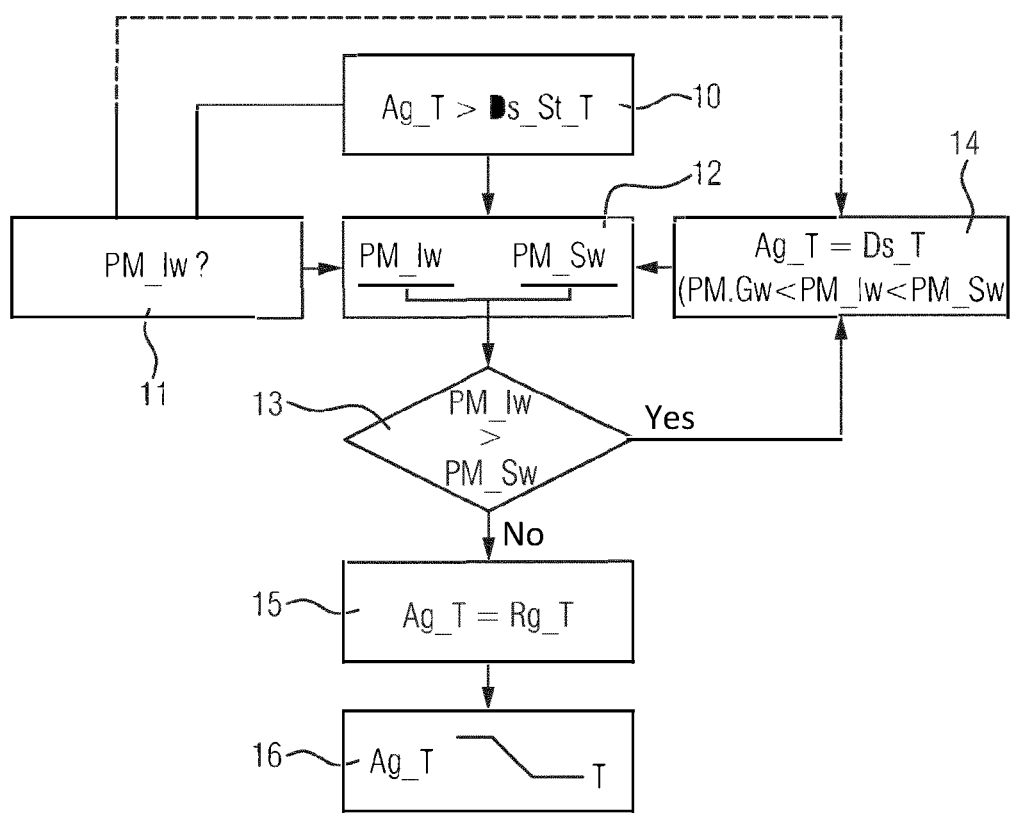
FIG. 2 shows a flow diagram for illustrating the important method steps of a method incorporating teachings of the present disclosure.

FIG. 2 shows a flow diagram for illustrating the important method steps of a method incorporating teachings of the present disclosure. In a first method step 10, for the purpose of starting a regeneration phase, the exhaust-gas temperature (Ag_T) measured by means of the ePM-S is increased to a temperature value above a desorption start temperature (Ds_St_T) from a normal operation level (Ag_T>Ds_St_T). This is realized for example by means of corresponding setting of the operating parameters of the internal combustion engine by the electronic engine control unit. The desorption start temperature is the temperature above which the desorption, that is to say the release of the sulfur compounds accumulated in the particle filter, begins, and is above 300° C. in all cases. Here, it is firstly possible for an increase in temperature to a temperature within the desorption temperature range between 300° C. and 500° C., or else to a temperature within the regeneration temperature range between 550° C. and 750° C., to be actuated.

At the same time, or in the next method step 11, the monitoring of the particle mass contained in the exhaust-gas flow downstream of the particle filter by means of an electrostatic particle mass sensor (ePM-S) arranged in the exhaust-gas flow downstream of the particle filter begins, said sensor generating a particle mass actual value (PM_Iw) which is dependent on the particle mass and supplying this, as an electrical signal, for example to the CPU or to a processing unit which is set up separately therefrom.

In a further method step 12, the particle mass actual value (PM_Iw) generated by the ePM-S is then compared with a predefined particle mass threshold value (PM_Sw), above which the formation of white smoke can be expected.

In the next method step 13, a branching of the method sequence is realized according to the result of the comparison from method step 12. If the particle mass actual value (PM_Iw) is greater than the predefined particle mass threshold value (PM_Sw), that is to say PM_Iw exceeds PM_Sw, the branching is realized toward method step 14, in which step the exhaust-gas temperature (PM_Iw) is set to a desorption temperature (Ds_T) for the release of sulfur compounds accumulated in the particle filter. Through the repeated passing-through of the method steps 12, 13 and 14, the desorption temperature (Ds_T) remains set until PM_Iw falls below PM_Sw.

In some embodiments, the exhaust-gas temperature (Ag_T) amy be regulated in a manner dependent on the particle mass actual value (PM_Iw), measured by the electrostatic particle mass sensor (ePM_S), such that the particle mass actual value (PM_Iw) remains below the particle mass threshold value (PM_Sw) but above a lower particle mass limit valve (PM_Gw), this ensuring that no white smoke forms. This alternative "desorption regulation" is illustrated in FIG. 2 by the broken-line connection between method steps 11 and 14 and also the additional condition PM_Gw<PM_Iw<PM_Sw added in brackets in method step 14.

In some embodiments, the particle mass actual value is adjusted to a value which lies in the upper third of the range spanned by the particle mass threshold value and the particle mass limit value, that is to say is close to the particle mass threshold value. The desorption rate is close to the limit for white smoke formation, and thus the duration of the desorption can be shortened.

If the comparison in method step 12 reveals that PM-Iw falls below or does not exceed PM_Sw, this is a sign that there is no longer any significant loading of the particle filter with sulfur compounds (or there was already no such loading at the beginning of the method), and that the actual regeneration of the particle filter can be realized. The branching toward method step 15, in which the exhaust-gas temperature (Ag_T) is set to a regeneration temperature (Rg_T), for the burning-off of the particle loading of the particle filter, for a predetermined time period, is thus realized. Here, the time period is predetermined such that the particle loading of the particle filter is completely removed. After the predetermined time period has elapsed, in method step 16, the regeneration phase is then completed by the exhaust-gas temperature (Ag_T) being lowered to the normal operation level.

Figure 3:
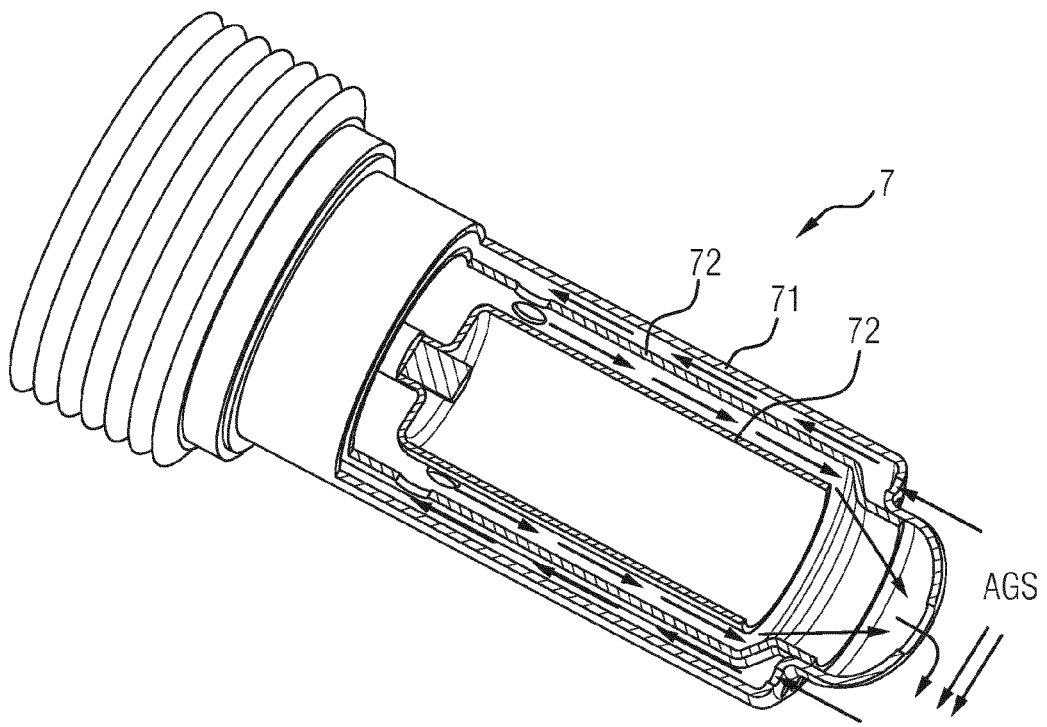
FIG. 3 shows a simplified schematic sectional illustration of an electrostatic particle mass sensor (ePM-S) incorporating teachings of the present disclosure.

In FIG. 3, a simplified schematic sectional illustration of an electrostatic particle mass sensor 7 (ePM-S) can be seen. The ePM-S 7 has, in a sensor housing 71, electrodes 72 which are spaced apart from one another and which form an electric field. A part of the exhaust-gas flow AGS (illustrated by arrows), which flow is laden with particles and sulfur compounds, is conducted through said electric field between the electrodes 72. In the process, electrical charges are transmitted between the electrodes 72, this being measurable as an electrical signal which is proportional to the particle mass and the sulfur content of the exhaust-gas flow AGS.

What is claimed is:

1. A method for the regeneration of a particle filter in an exhaust system of an internal combustion engine during operation, the method comprising:

starting a regeneration phase by increasing a measured exhaust-gas temperature from a normal operation level to a temperature value above a desorption start temperature at which sulfur compounds accumulated in the particle filter begin to release;

monitoring a particle mass contained in an exhaust-gas flow downstream of the particle filter with an electrostatic particle mass sensor arranged in the exhaust-gas flow; comparing the particle mass to a predefined particle mass threshold value associated with white smoke formation;

if the particle mass threshold value is exceeded, setting the exhaust-gas temperature to a desorption temperature for release of sulfur compounds accumulated in the particle filter until the particle mass falls below the particle mass threshold value;

if the particle mass threshold value is not exceeded, setting the exhaust-gas temperature to a regeneration temperature for burning-off of the particle loading of the particle filter for a predetermined time period; and after the predetermined time period has elapsed, ending the regeneration phase by lowering the measured exhaust-gas temperature to the normal operation level.

2. The method for the regeneration of a particle filter as claimed in claim 1, wherein the exhaust-gas temperature is increased to the desorption temperature to start the regeneration phase.

3. The method for the regeneration of a particle filter as claimed in claim 1, wherein the exhaust-gas temperature is increased to the regeneration temperature to start the regeneration phase.

4. The method for the regeneration of a particle filter as claimed in claim 1, wherein the desorption temperature lies in a temperature range of 300° C. to 500° C.

5. The method for the regeneration of a particle filter as claimed in claim 1, wherein the regeneration temperature lies in a temperature range of 550° C. to 750° C.

6. The method for the regeneration of a particle filter as claimed in claim 1, wherein, if the particle mass threshold value is exceeded, the exhaust-gas temperature is regulated based on the particle mass such that the particle mass remains below the particle mass threshold value but above a lower particle mass limit value set to avoid formation of white smoke.

7. The method for the regeneration of a particle filter as claimed in claim 1, wherein the exhaust-gas temperature is set or regulated by an electronic engine control unit depending at least in part on the measured exhaust-gas temperature and on the particle mass.

8. The method for the regeneration of a particle filter as claimed in claim 1, wherein the electrostatic particle mass sensor comprises electrodes spaced apart from one another forming an electric field through which a part of the exhaust-gas flow is conducted; and wherein electrical charges are transmitted between the electrodes, generating an electrical signal proportional to a particle mass and to a sulfur content of the exhaust-gas flow.

* * * * *